March 8, 1932.  T. A. BOYD ET AL  1,848,990
EXHAUST GAS TREATMENT
Filed Aug. 13, 1927
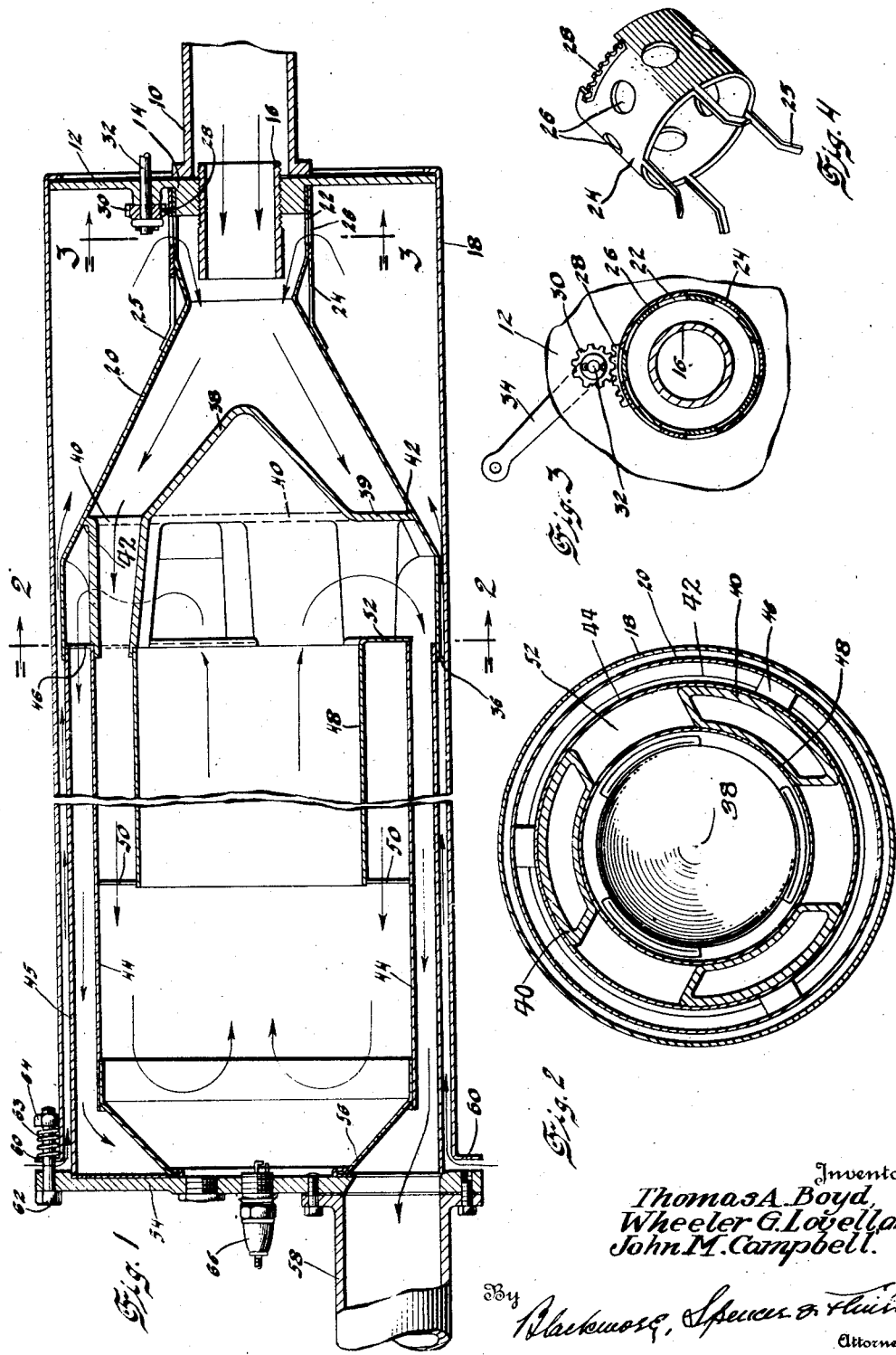
Inventors
Thomas A. Boyd,
Wheeler G. Lovell and
John M. Campbell.
By Blackmore, Spencer & Fluit
Attorneys Patented Mar. 8, 1932

1,848,990

UNITED STATES PATENT OFFICE

THOMAS A. BOYD, WHEELER G. LOVELL, AND JOHN M. CAMPBELL, OF DETROIT, MICHIGAN, ASSIGNORS TO GENERAL MOTORS RESEARCH CORPORATION, OF DETROIT, MICHIGAN, A CORPORATION OF DELAWARE

EXHAUST GAS TREATMENT

Application filed August 13, 1927. Serial No. 212,710.

This invention relates to a device for the treatment and disposal of exhaust gases from an internal combustion engine.

The exhaust gases that are discharged from most internal combustion engines as they are operated today, especially in motor vehicles, include carbon dioxide, carbon monoxide, hydrogen, water vapor, partially oxidized hydrocarbons, and occasionally some free carbon. Among the constituents just enumerated, carbon monoxide and partially oxidized hydrocarbons are particularly undesirable, the former because it is harmful to animal life, and the latter, because of unpleasant odor.

Inasmuch as both of these types of undesirable constituents are combustible, it has been proposed to eliminate them by mixing the exhaust gases with the proper amount of air, and burning the resulting mixture, thereby producing an exhaust gas that is odorless and harmless. As a general rule, the exhaust gases from automobile engines contain such a small amount of combustible matter that, at the temperature the gas assumes after it has been exhausted from the engine and been mixed with a suitable amount of air, combustion will not support itself, because the amount of heat generated in the combustion is not large enough to heat succeeding portions of the gas to its kindling or ignition temperature. It has been shown that the limit of inflammability of a gas that is lean in combustible is dependent upon the magnitude of its initial temperature. Thus, for instance, a mixture which will not support combustion at ordinary temperatures, may be easily combustible at a higher temperature, after it has been ignited by some suitable means such as an electric spark. The problem in connection with the burning of exhaust gas, therefore, is to bring the initial temperature of the air and gas mixture to a point that is high enough for combustion to support itself, whereupon the flame will rapidly proceed through the mixture after it has once been initiated.

It has been proposed to mix the exhaust gases with air close to the engine so that as little as possible of the heat of the primary combustion will be lost. Aside from the difficulty of locating the secondary combustion chamber closely enough to the exhaust to take the maximum advantage of the heat from the engine, the cooling effect of the air mixed therewith is such that combustion does not occur properly.

In the working out of a device that would accomplish the desired result, we have aimed to incorporate into it five basic elements of construction, as follows:

(1) A means for pre-heating the raw air by exchange of heat with the waste gases leaving the burner.

(2) A means for getting the air and exhaust gas thoroughly mixed before ignition.

(3) A means for further heating the mixture of air and exhaust gas by exchange of heat with the hot burned gases.

(4) A means for igniting the combustible mixture.

(5) Provision for the combustion chamber to be of a size sufficient to insure complete combustion within the burner.

The counter current principle of heat exchange has been embodied in our invention in order that the incoming gases may be heated to just as high a temperature as possible before entering the chamber where they are burned. It is important to obtain the very highest possible temperature in the combustion chamber in order to burn gases which are quite lean in combustible. This high temperature is secured in our invention by making the combustion chamber the innermost part of the burner; so that the combustion chamber is almost entirely surrounded by a number of annular spaces through which flow hot incoming gases, hot out-going gases, and warm air, respectively, naming in order from the inner space to the outer space.

In the use of this structure, it may be desirable to provide an ignition element within the inner chamber, such as a spark plug or incandescent filament. This element may be kept in operation constantly or if, after combustion has proceeded some time and the parts have become quite hot, combustion will continue without the ignition element, it may be shut off. In a device of this kind it may be desirable to place all the parts in close proximity to the engine, omitting the ignition element and relying solely on the heat from the exhaust for starting the secondary combustion.

We have designed this device having in mind especially the problem of disposing of the exhaust from the engine of a motor-propelled vehicle but we desire it to be ditinctly understood that it is not limited in its scope to a vehicle but may be used to good advantage with an internal combustion engine regardless of where used.

In the drawing:

Figure 1 is a longitudinal vertical section of our device, showing the construction of our secondary combustion chamber.

Figure 2 is a section taken on the line 2—2 of Figure 1.

Figure 3 is a section taken on the line 3—3 of Figure 1.

Figure 4 is a perspective view of the closure member which may be adjusted to vary the amount of air which is permitted to enter the secondary combustion chamber.

Referring to the drawings, the numeral 10 indicates a portion of the exhaust pipe, which is the outlet for the exhaust gases from the engine, and normally extends rearward from the engine and under the body in the case of a motor vehicle. Connected to the exhaust pipe is the secondary combustion chamber, this term being used to distinguish from the primary combustion chambers of the engine proper.

The secondary combustion chamber comprises the disk-shaped end member or casting 12 fixed to the exhaust pipe 10 in any desired manner, as by welding or by rivets or bolts (not shown). The end member 12 is provided with an enlarged or thickened central portion 14 having a threaded opening corresponding to the exhaust pipe 10 and fixed in this opening is the stub pipe 16. Fitting over the member 12 is the outer cylindrical casing 18. Fitting over the enlarged portion 14 of the end member 12, and fixed thereon as by welding, is the substantially cone-shaped inlet or inlet chamber 20. The inlet 20 is provided adjacent the enlarged portion 14 with circumferentially arranged apertures 22. Surrounding the inlet at this point is the closure member 24 provided with apertures 26 corresponding in size and number to the apertures 22. The closure member 24 fits against the member 12 and is provided with a diverging rear end 25 for fitting against the cone-shaped portion of the inlet 20, thus being held against longitudinal movement. The member 24 may be rotatably adjusted by means of a toothed rack or segment 28 provided thereon and meshing with the pinion 30 fixed to the shaft 32. Mounted on the shaft 32 is an arm 34 which may be connected to any desired means (not shown) for angular adjustment. The rear end of the inlet 20 is provided with circumferentially spaced bent out portions 36, three being shown, for holding the inlet snugly in the casing 18.

Fitting within the inlet 20 is a somewhat cone-shaped casting or conduit member 38 provided with three circumferentially arranged conduits 40. Bent out portion 42 are provided on the member 38 for fitting against the cone-shaped portion of the inlet 20. The flange 39 of the casting 38 completely closes the rear end of the cone-shaped inlet 20 except for the openings through the conduits 40. Fitting around the outside of these conduits and welded thereto is the inner casing 44, which is provided with spaced bent out portions 46 for holding it within the rear end of the inlet 20. Fitting within the rear end of the inlet 20 and slidable longitudinally relatively thereto is the intermediate cylindrical casing 45 which is fixed at its rear end, by welding or otherwise, to the disk shaped rear end casting 54. Fixed within the rear ends of the conduits 40 is the outlet cylinder 48 provided with spaced bent out portions 50 for holding the cylinder within the casing 44. By this arrangement it will be seen that the conduits 40 open directly into the annular space between the casing 44 and outlet cylinder 48. The forward entrance to this annular space is closed by bent out portions 52 of the cylinder 48, except in the three sections corresponding to the conduits 40.

The rear end of the combustion chamber is closed by the rear end casting 54 in the center of which is fixed a casing 56 substantially the shape of a truncated cone. The forward portion of the casing 56 is cylindrical with a conical end and fits snugly and slidably within the inner casing 44. Fixed to the member 54 by bolts or otherwise is the outlet pipe 58.

The outer casing 18 is provided at its rear end with a bent out portion or flange 60. Bolts 62 connect the end member 54 and flange 60 at spaced intervals about the periphery thereof, a coiled expansion spring 63 being placed about each bolt 62 between the flange 60 and the nut 64. In the center of the end member 54 is the ignition element 66. We have illustrated this as a spark plug which may be connected with the ignition system so that when desired a continuous spark can be maintained across the spark gap. However, any other suitable ignition element may be used, such as an incandescent filament.

We thus provide a telescopic inner combustion chamber made up of two parts, the first comprising the inlet chamber 20 and casing 44 fixed rigidly therewith and a second element slidable longitudinally therewith and comprising the cone-shaped end casing 56 fixed rigidly to the disk-shaped end member 54. These two telescopic members are resiliently held together by the spring pressed bolts 62 connecting the member 54 and the outer casing 18 which is rigid with relation to the inlet chamber 20 and casing 44.

The operation of our device is as follows: During the normal operation of the engine, the exhaust gases pass from the engine through the exhaust pipe 10 and through the stub pipe 16 into the cone-shaped inlet 20. The central or neck portion of the inlet 20 is constructed as illustrated. The entering current of exhaust gases creates a suction at this point, as indicated by the arrows, and air is drawn in through the openings 22 and 26 from the space between the inlet 20 and outer casing 18, the free entrance of air to this space being permitted between the intermediate casing 45 and outer casing 18. The air thus entering is heated by passing over the intermediate casing 45 which is heated by the hot burnt gases escaping from the combustion chamber, as described below. The preheated air enters through the openings 22 and 26 and mixes with the exhaust gases entering through the stub pipe 16. The mixture then passes through the conduits 40 between the inner casing 44 and outlet cylinder 48 and on to the rear of the chamber adjacent to the spark plug, as indicated by the arrows. The hot mixture is ignited by the continuous spark and burns rapidly. These burning gases pass out through the outlet cylinder 48 and between the conduits 40 into the annular space between the inner casing 44 and intermediate casing 45 and out through the outlet pipe 58, as indicated by the arrows.

In case too much air is mixing with the exhaust gases, the closure member 24 may be rotated by means of the arm 34 and the effective size of the apertures adjusted to the position which gives most efficient operation.

The spaced springs 63 expand and contract during operation of the device in order to permit the chamber to expand longitudinally to allow for uneven combustion, limited expansion and contraction or telescopic movement being permitted by the sliding contact of the various elements as described.

In starting the burner from the cold, it is usually necessary to choke the engine in order to provide the burner with exhaust gas that is rich enough in combustible to maintain its combustion at that low temperature. As soon as the metal of the burner becomes hot enough, choking is no longer required.

It may not be necessary to maintain the continuous spark at the spark plug after this secondary combustion has been maintained for some time and the parts have become heated, and if so the spark may then be cut out. Added efficiency is given the device by the fact that the burning gases pass out of the combustion chamber through the annular space between the inner casing 44 and intermediate casing 45 and thus maintain the parts at a high temperature which is conducive to most complete oxidation of the unburnt constituents of the entering products of the primary or engine combustion chambers.

In case it is desired to burn a very lean exhaust gas, it may be necessary to surround the entire burner with asbestos or with some other thermal insulating material that is sufficiently heat resistant, in order to retain as much heat as possible within the burner.

We claim:

1. In combination with an exhaust pipe, a device connected to the pipe for burning the combustible gases in the exhaust gas of an internal combustion engine comprising front and rear end members, means for admitting air to the device a plurality of telescopic casings having their ends secured to said members, an outer casing rigidly secured to one member and resiliently and movably connected to the other member, an ignition element in the innermost casing, means for delivering air from between the outermost casings to the innermost casing, and means for allowing the flow of gas from the inner casing between the two innermost casings to an opening in the rear end member.

2. In combination with an exhaust pipe, a device connected to the pipe for burning the combustible gases in the exhaust gas from an internal combustion engine comprising an inner combustion casing or chamber, an ignition element in said chamber, an exhaust gas inlet to said chamber, an exhaust outlet from said chamber including a casing surrounding said combustion casing, a casing surrounding said second named casing and defining a space therebetween to allow for the ingress of air, and means for delivering the air to the combustion chamber.

3. In combination with an exhaust pipe, a device connected to the pipe for burning the combustible gases in the exhaust gas of an internal combustion engine comprising front and rear end members, means for admitting air to the device, a plurality of spaced telescopic casings having their ends secured to said members, an outer casing rigidly secured to one end member and resiliently and movably connected to the other end member, an ignition element to ignite the combustible gas in the innermost casing, means for delivering air from between the outermost casings to the innermost casing, means for allowing the flow of gas from the inner casing into the space between the two innermost casings to an opening in the rear end member, and means to control the amount of air admitted to the inner casing.

4. In combination with an exhaust pipe, a device connected to the pipe for burning the combustible gases in the exhaust gas of an internal combustion engine comprising front and rear end members, means for admitting air to the device, three spaced telescopic casings having their ends secured to said members, an outer casing rigidly secured to one member and resiliently and movably connected to the other member, an ignition element to ignite the combustible gas in the innermost casing, means for delivering air from between the outermost casings to the innermost casing, and means for allowing the flow of gas from the inner casing into the space between the two innermost casings to an opening in the rear end member.

5. In combination with an exhaust pipe, a device for burning the combustible gases in the exhaust gas from internal combustion engines, consisting of a plurality of spaced concentric casings and chambers, end pieces rigidly connected to said casings, an inlet from the exhaust pipe at one end piece to a first casing, an outlet from a second casing at the other end piece, an ignition element to ignite the combustible gas in the innermost casing, an outlet from said innermost casing directly to a second casing, and a passage between the outermost casings and an inlet to said first casing for delivering air to said first named casing.

6. In combination with an exhaust pipe, a device for burning the combustible gases in the exhaust gas from internal combustion engines, consisting of a plurality of concentric casings and chambers the innermost casings comprising a plurality of relatively slidable parts, end pieces rigidly connected to said casings, an inlet from the exhaust pipe at one end piece to one casing, an outlet from a second casing at the other end piece, an ignition element to ignite the combustible gas in the innermost casing, means to allow the ingress of air to the device, and means to cause the air to flow to the innermost casing.

7. In combination with an exhaust pipe, a device connected to the pipe for burning the combustible gases in the exhaust gas from an internal combustion engine comprising an inner combustion casing and chamber, an ignition element to ignite the combustible gases in said chamber, an exhaust gas inlet to said casing, an exhaust outlet from said casing including a casing surrounding said combustion casing, a casing surrounding said second named casing and defining an air passage therebetween, means for delivering the air to the combustion chamber, end portions on said device, said outer casing spaced from one of the end portions to allow for the ingress of air, and bolts and surrounding springs urging said outer casing toward said one end.

8. In combination with an exhaust pipe, a device for burning the combustible gases in the exhaust gas from internal combustion engines, consisting of a plurality of concentric casings, end pieces, each end piece having some of the casings rigidly connected thereto, the outermost of said casings comprising a single piece resiliently and movably connected to one of said end pieces and rigidly secured to the other, an inlet from the exhaust pipe at one end piece and connected to a second casing, an outlet from said second casing at the other end piece, an ignition element to ignite the combustible gases in a third casing, means to allow the gases to flow between the second and third casings, means for delivering air from the outermost casing to said inlet, and means for allowing the entrance of air to said outermost casing.

In testimony whereof we affix our signatures.

THOMAS A. BOYD.
WHEELER G. LOVELL.
JOHN M. CAMPBELL.